(12) United States Patent
Roop

(10) Patent No.: US 10,399,673 B1
(45) Date of Patent: Sep. 3, 2019

(54) INTEGRATED FLOAT-WING

(71) Applicant: Kitty Hawk Corporation, Mountain View, CA (US)

(72) Inventor: Joseph Roop, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 346 days.

(21) Appl. No.: 15/332,634

(22) Filed: Oct. 24, 2016

(51) Int. Cl.
| | |
|---|---|
| *B64C 3/30* | (2006.01) |
| *B64C 25/54* | (2006.01) |
| *B64C 35/00* | (2006.01) |
| *B64C 29/00* | (2006.01) |
| *B64C 25/56* | (2006.01) |
| *B64C 3/10* | (2006.01) |
| *B64C 39/06* | (2006.01) |

(52) U.S. Cl.
CPC .............. *B64C 25/56* (2013.01); *B64C 3/10* (2013.01); *B64C 3/30* (2013.01); *B64C 29/0033* (2013.01); *B64C 35/001* (2013.01); *B64C 39/062* (2013.01)

(58) Field of Classification Search
CPC .. B64C 3/10; B64C 3/30; B64C 25/54; B64C 25/56; B64C 35/00; B64C 35/001; B64C 35/002; B64C 35/003; B64C 35/008; B64C 39/062; B60F 5/02
See application file for complete search history.

(56) References Cited

U.S. PATENT DOCUMENTS

| | | | | |
|---|---|---|---|---|
| 1,165,770 A | * | 12/1915 | Gallaudet | B64C 35/00 |
| | | | | 244/105 |
| 1,704,076 A | * | 3/1929 | Carroll | B64C 35/00 |
| | | | | 244/101 |
| 2,711,868 A | * | 6/1955 | Parker | B64C 25/56 |
| | | | | 114/54 |
| 2,952,422 A | | 9/1960 | Fletcher | |
| 3,181,810 A | | 5/1965 | Olson | |
| 3,259,343 A | | 7/1966 | Roppel | |

(Continued)

FOREIGN PATENT DOCUMENTS

| | | |
|---|---|---|
| WO | WO2014067563 | 5/2014 |
| WO | WO-2016109408 | 7/2016 |

OTHER PUBLICATIONS

Author Unknown, Tail-sitter, from Wikipedia, the free encyclopedia, downloaded from https://en.wikipedia.org/wiki/Tail-sitter, last modified Mar. 23, 2016.

(Continued)

*Primary Examiner* — Joseph W Sanderson
(74) *Attorney, Agent, or Firm* — Van Pelt, Yi & James LLP

(57) ABSTRACT

An aircraft which includes a float-wing having a leading edge, a trailing edge, and an airfoil shape to produce aerodynamic lift when the float-wing flows through air at a lift-producing angle of attack in a forward flight mode of operation. The float-wing further includes a submersible portion that includes at least the trailing edge and which is constructed of materials and in a shape selected to produce a buoyancy force sufficient to prevent at least a non-submersible portion of the aircraft from being submersed under conditions in which the aircraft is in a waterborne non-flight position in which at least the trailing edge of the float-wing is submersed but at least the non-submersible portion of the aircraft is not submersed.

18 Claims, 6 Drawing Sheets

(56) References Cited

U.S. PATENT DOCUMENTS

| | | | |
|---|---|---|---|
| 3,350,035 A | | 10/1967 | Schlieben |
| 3,592,412 A | | 7/1971 | Glatfelter |
| 4,484,721 A | * | 11/1984 | Gue .................. B64C 35/00 |
| | | | 114/274 |
| 4,982,914 A | | 1/1991 | Eickmann |
| 5,280,863 A | | 1/1994 | Schmittle |
| 5,405,105 A | | 4/1995 | Kress |
| 5,725,709 A | * | 3/1998 | Jensen ................ B29C 70/30 |
| | | | 156/169 |
| 6,402,088 B1 | | 6/2002 | Syrovy |
| 8,152,096 B2 | | 4/2012 | Smith |
| 8,505,846 B1 | | 8/2013 | Sanders, II |
| 8,733,690 B2 | | 5/2014 | Bevirt |
| 9,120,560 B1 | | 9/2015 | Armer |
| 9,187,174 B2 | | 11/2015 | Shaw |
| 9,944,386 B1 | * | 4/2018 | Reichert .............. B64C 27/08 |
| 10,059,436 B1 | * | 8/2018 | Robertson ........... B64C 25/54 |
| 10,081,422 B1 | * | 9/2018 | Reichert .............. B64C 27/08 |
| 10,086,931 B2 | * | 10/2018 | Reichert .............. B64C 27/08 |
| 2002/0096600 A1 | * | 7/2002 | Richards ............ B64C 35/001 |
| | | | 244/105 |
| 2003/0062443 A1 | | 4/2003 | Wagner |
| 2004/0245374 A1 | | 12/2004 | Morgan |
| 2005/0230519 A1 | | 10/2005 | Hurley |
| 2006/0060701 A1 | * | 3/2006 | Richards ............ B64C 35/001 |
| | | | 244/105 |
| 2006/0081732 A1 | * | 4/2006 | From .................... B64C 25/54 |
| | | | 244/105 |
| 2009/0049757 A1 | * | 2/2009 | Potter ................ B63B 35/7913 |
| | | | 52/2.23 |
| 2010/0072325 A1 | | 3/2010 | Sambell |
| 2012/0234968 A1 | | 9/2012 | Smith |
| 2013/0020429 A1 | | 1/2013 | Kroo |
| 2018/0057155 A1 | * | 3/2018 | Reichert .............. B64C 27/08 |
| 2018/0244364 A1 | * | 8/2018 | Fenny .................. B64C 27/08 |

OTHER PUBLICATIONS

Author Unknown, Tiltwing, from Wikipedia, the free encyclopedia, downloaded from https://en.wikipedia.org/wiki/Tiltwing, last modified May 26, 2015.

* cited by examiner

INTEGRATED FLOAT-WING

BACKGROUND OF THE INVENTION

New types of aircraft, for example with new features and/or with new flight applications, are currently being developed. For example, electric (battery-powered) aircraft are being developed. The weight of an aircraft affects performance because heavier aircraft consume more power. Aircraft may also be designed to land on water (among other surfaces). Typically, such aircraft has a dedicated boom or float to provide buoyancy. A dedicated boom or float increases cost and weight and may be aerodynamically undesirable. New aircraft components for such aircraft which keep cost and/or weight down, or are aerodynamically efficient, would be desirable.

BRIEF DESCRIPTION OF THE DRAWINGS

Various embodiments of the invention are disclosed in the following detailed description and the accompanying drawings.

DETAILED DESCRIPTION

Figure 1A:
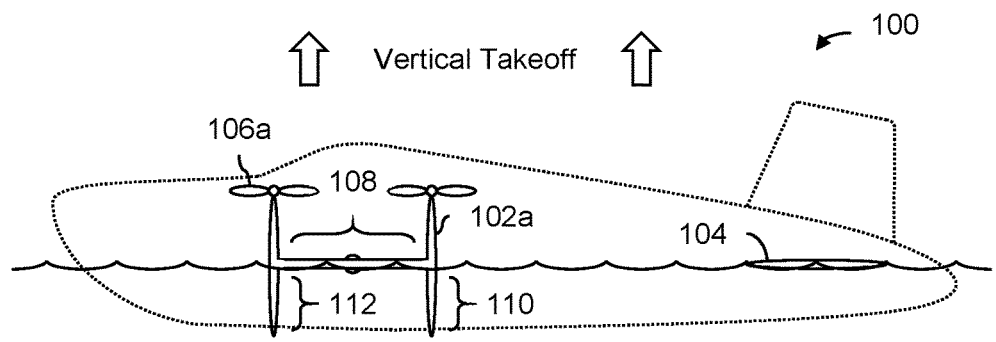
FIG. 1A is a diagram illustrating an embodiment of a biplane with float-wings.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiment of an aircraft are described herein where the aircraft includes a float-wing with a leading edge and a trailing edge. The float-wing also has an airfoil shape to produce aerodynamic lift when the float-wing flows through air at a lift-producing angle of attack in a forward flight mode of operation. As will be described in more detail below, in some embodiments, the float-wing is able to rotate and can be in a forward flight mode or position or a hovering mode or position. The float-wing also includes a submersible part that includes at least the trailing edge and is (generally speaking) buoyant (e.g., it is constructed of materials and has a shape selected to produce a buoyancy force which is sufficient to prevent at least a non-submersible portion of the aircraft from being submersed when the aircraft is not flying and/or floating and the trailing edge of the float-wing (at least) is submersed but at least the non-submersible portion of the aircraft is not submersed). In some embodiments described below, the exemplary aircraft lands on water with its float-wing in a hovering position or mode so that the trailing edge of the float-wing is submerged and provides buoyancy (e.g., including for the rest of the aircraft).

FIG. 1 is a diagram illustrating an embodiment of a biplane with float-wings. In this example, the wings of the aircraft are biplane-style wings but this design selection is merely exemplary and is not intended to be limiting. Similarly, the shape of the fuselage is merely exemplary and is not intended to be limiting. Other wing design examples and fuselage design example are described in more detail below.

Diagram 100 shows a side view of the exemplary biplane. In all of the examples described herein, the aircraft are overwater aircraft which takeoff and land over water. To takeoff, the wings of the biplane are in the position shown in diagram 100: the leading edge of the biplane wings (102a) point toward the sky. Rotors (106a) are mounted or otherwise attached to the edge of the biplane wings in a fixed manner (e.g., their position cannot be moved or angled with respect to the wings). Such rotors may be desirable because they are lighter, less expensive, and/or less complex than rotors which can be angled or moved (e.g., to steer the aircraft). The position of the biplane wing in diagram 100 therefore orients the rotors (106a) so that they rotate in a horizontal plane. The rotors are sped up (e.g., at substantially the same speed to avoid creating a lift differential) to produce a vertical thrust which lifts the biplane vertically into the air. The biplane wings in this position, mode, or configuration (e.g., shown in diagram 100) may be referred to as a hovering mode or configuration since the rotors are oriented in a position that is better for (e.g., more efficient for) hovering as opposed to forward flight.

Flying the biplane as configured in diagram 100 may be desirable in some cases. For example, if the pilot wants to hover at the same in-air position, then the configuration shown in diagram 100 may enable the biplane to more efficiently hover. Or, if the pilot wants to fly (mostly) straight up or straight down, then the configuration shown in diagram 100 may enable the biplane to more efficiently fly straight up or straight down. This is desirable because less power is consumed.

In some cases it may be desirable to have the rotors instead rotate in the vertical plane. See, for example, diagram 120 of FIG. 1B. FIG. 1B is a diagram illustrating an embodiment of a biplane with float-wings. In that configuration or mode, the biplane wings (102b) are rotated (e.g., compared to the position shown in diagram 100) such that the rotors (106b) are rotating in the vertical plane. When oriented as shown in diagram 120, the rotors provide horizontal thrust and the biplane has better forward flight performance (e.g., compared to the configuration shown in diagram 100). Therefore, if the pilot wishes to fly (substantially) forward, then putting the rotors into the position shown in diagram 120 enables the biplane to fly in an efficient manner. The configuration of the wings and/or rotors shown in diagram 120 may be referred to herein as a forward flight mode or forward flight configuration.

The fuselage remains in substantially same position because of a bearing which permits the fuselage and wings to rotate with respect to each other. Therefore, as the wings and rotors "flip up" (in this example from a hovering configuration to a forward flight configuration), gravity will keep the fuselage in the same position (e.g., the fuselage will settle into a position where the center of mass is directly beneath the bearing). It is noted that this rotation of the fuselage (e.g., where the fuselage rotates with respect to the fuselage to remain level) is passive, not active.

To transition from the configuration shown in diagram 120 (e.g., a forward flight configuration) to the configuration shown in diagram 100 (e.g., a hovering configuration), some rotors are rotated faster than other rotors. This induces external aerodynamic forces (e.g., as opposed to some internally applied force which causes a wing to rotate from the inside out) which causes the wing to switch from the forward flight wing position shown in diagram 120 to the hovering wing position shown in diagram 100.

Figure 1B:
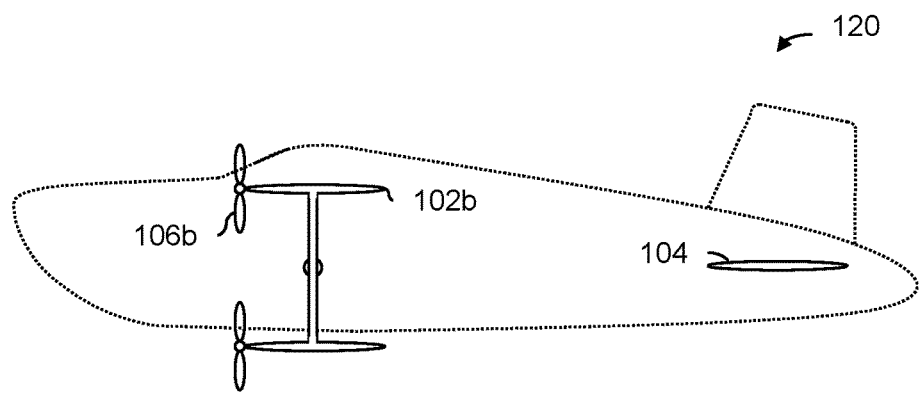
FIG. 1B is a diagram illustrating an embodiment of a biplane with float-wings.
Figure 1C:
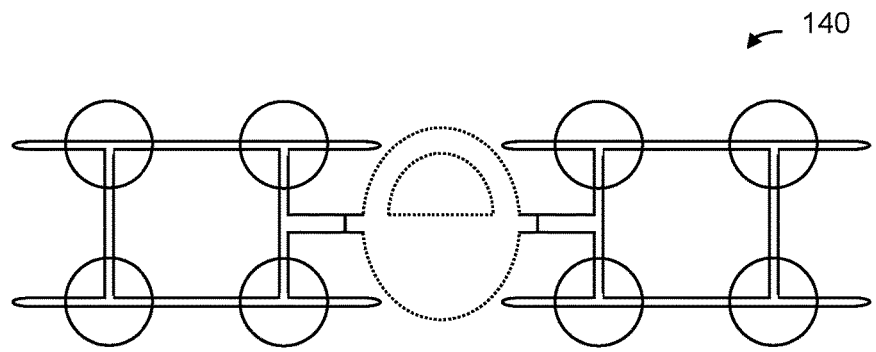
FIG. 1C is a diagram illustrating an embodiment of a biplane with float-wings.

FIG. 1C is a diagram illustrating an embodiment of a biplane with float-wings. Diagram 140 shows a front view which corresponds to the side view shown in diagram 120 (that is, the wings in diagram 140 are in the forward flight position). In this example, there are a total of eight rotors which are placed on the biplane wings at the cross bars. The four rotors on the top are the ones which are rotated faster compared to the four rotors on the bottom to switch from the configuration or position shown in diagram 100 to that shown in diagram 120. It is noted that the number and placement of rotors shown here is merely exemplary and is not intended to be limiting.

One benefit to the aircraft embodiments described herein is that they have both a hovering configuration and a forward flight configuration while permitting the pilot to remain in an upright and comfortable position the entire time. For example, a tail-sitter requires the pilot to be facing upwards during takeoff and less nimble pilots may find it difficult to maneuver themselves into the proper position. In that position, a pilot may also find it difficult to see the horizon, which makes taking off difficult (e.g., the aircraft may have minimal instrumentation to keep cost, weight, and/or complexity down). Also, a tail-sitter at takeoff typically requires specialized equipment such as a lift or a winch to position the tail-sitter so that it is sitting on its tail. In contrast, no specialized equipment is required to put the exemplary biplane (as an example) into some special or different takeoff position.

Another benefit to the aircraft embodiments described herein is that they use relatively simple rotors. In this example and other examples described below, steering or maneuvering of the aircraft is achieved by spinning up or spinning down selected rotors in order to achieve a differential in the horizontal thrust and/or a vertical lift, as opposed to moving the position of the rotor and/or the angle of the blade. For example, the rotors are fixed to the biplane wing and there are no (as an example) cyclic controls which can adjust the roll or pitch (or, more generally, position) of the rotors relative to the wing. The position of the rotors relative to the wing remains fixed. Similarly, blades are at a fixed pitch angle and the angle is not adjustable. Using such rotors may be desirable because it reduces cost, weight, and/or design complexity.

Another benefit to the aircraft embodiments described herein is that there is no (as an example) hydro-mechanical part which rotates the fuselage and/or wings (e.g., from the inside of the wing). To put another way, the fuselage rotates passively, not actively, on the bearing due to gravity as the wing "flies around" the fuselage. Some other types of aircraft (such as tiltwings) have wings which are rotated using hydro-mechanical components which adds to the cost, weight, and/or design complexity. In contrast, the aircraft embodiments described herein do not so that they cost less, weight less, and/or are less complex.

Returning to diagram 100, diagram 100 shows the exemplary biplane floating in the water before takeoff. As shown, the biplane wing (specifically, the crossbar (108), the trailing half of the top/right wing (110), and the trailing half of the bottom/left wing (112)) and the horizontal tail wing (104) are at least partially submerged. The biplane wings and horizontal tail wing are made out of lightweight material (e.g., inflated with air and/or made of a lightweight material, such as foam) to provide buoyancy when the biplane is floating.

In addition to providing buoyancy, the biplane wings (102a) and horizontal tail wing (104) also provide lift. For example, in diagram 120, there is airflow going from left (i.e., the nose of the aircraft) to the right (i.e., the tail of the aircraft). This airflow goes past the biplane wings (102b) and horizontal tail wing (104) and creates an upward aerodynamic force. As used herein, the term float-wing is used to refer to a wing which provides both buoyancy (see, e.g., diagram 100) and lift (see, e.g., diagram 120).

Float-wings are useful because they serve multiple purposes and are useful during flight and also while floating. In contrast, a dedicated boom or float which only provides buoyancy (e.g., and which does not also provide lift when flying) would be a less attractive. Such a dedicated boom or float would add to the bill of materials, increasing the cost and weight of the aircraft. A dedicated boom or float may also have a shape which is aerodynamically undesirable and contributes significantly to drag when flying.

As shown in this example, a float-wing may comprise a rotatable wing which can switch between two (or more) positions (see, e.g., biplane wings 102a/102b). This figure also shows that a float-wing may be a fixed wing which does not rotate (see, e.g., horizontal tail wing 104).

The following figure shows an example of how the exemplary aircraft of FIGS. 1A-1C changes from vertical flight (e.g., which is better for and/or more efficient at hovering) to horizontal flight (e.g., which is better for and/or more efficient at forward flight). This may be useful in understanding how the exemplary aircraft operates as a whole.

Figure 2:
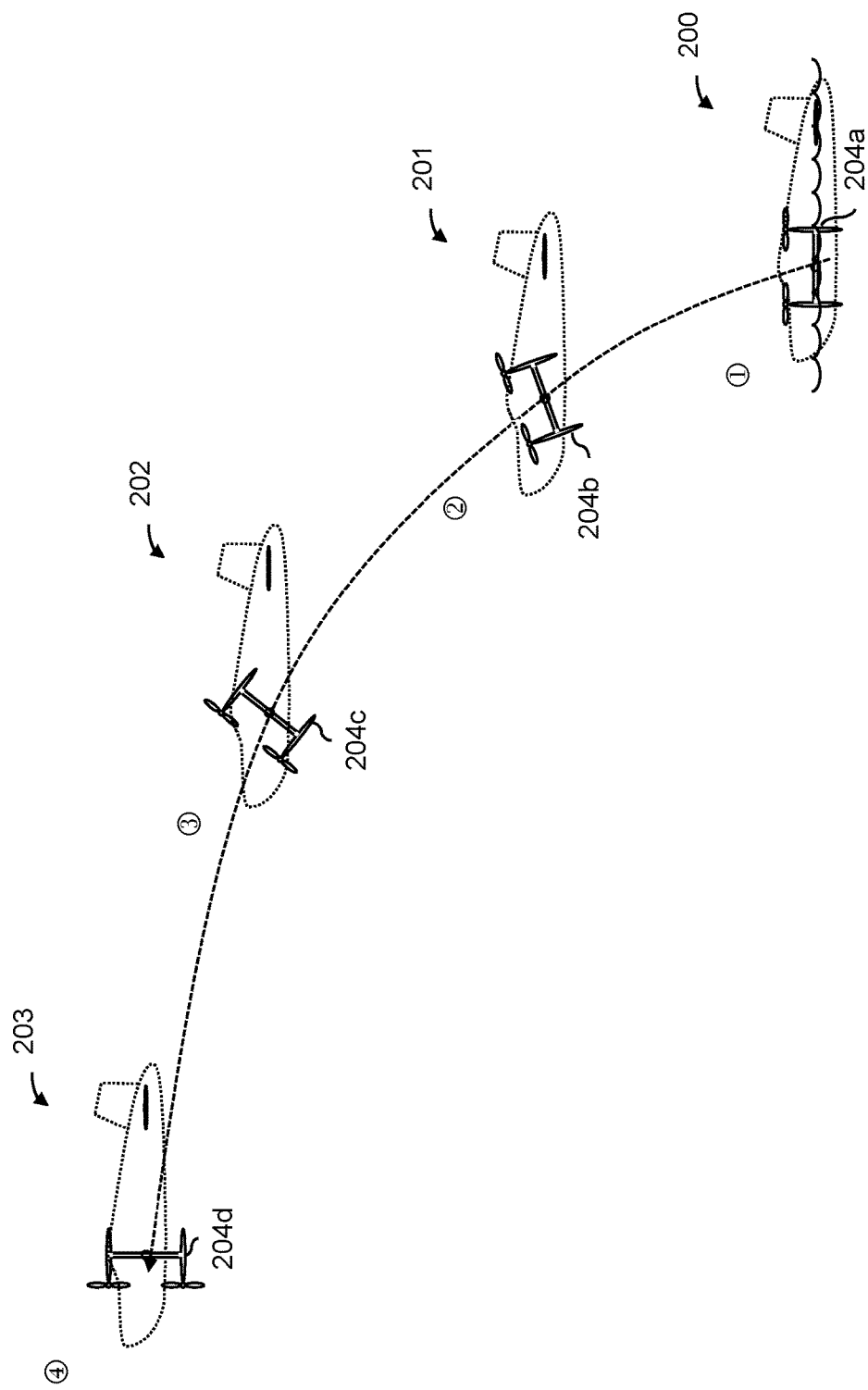
FIG. 2 is a diagram illustrating an embodiment of a biplane with float-wings which performs a vertical water takeoff and changes from a hovering configuration to a forward flight configuration.

FIG. 2 is a diagram illustrating an embodiment of a biplane with float-wings which performs a vertical water takeoff and changes from a hovering configuration to a forward flight configuration. FIG. 2 continues the example of FIGS. 1A-1C and shows the same exemplary biplane. Diagrams 201-203 show the biplane at various points in time.

In this example, the rotors of the biplane are selectively rotated at different speeds in order to change the flight mode or configuration. Generally speaking, the rotation of the rotors at different speeds induces external aerodynamic forces which cause the wings to "flip up" by flying the biplane forward and upward (e.g., along a curved path as shown in diagrams 200-203) into the forward flight position from the hovering position.

For example, diagram 200 shows the beginning position of the biplane wings (204a). The fuselage is level and the rotors are rotating in a horizontal plane at that point in time. Later, in diagrams 201 and 202, the wings (204b and 204c) appear to have tilted slightly compared to their previous angle or position as the biplane continues its climb forward and upward. As shown in those diagrams, as the biplane flies along its path (and the wings appear to rotate), the fuselage passively remains level with respect to the ground because of the bearing and gravity. Finally, in diagram 203, the biplane has completed its forward and upward climb and the biplane wings (206d) have rotated into the forward flight position even while the fuselage remains level with the ground. To put it another way, the upper and lower wings of the biplane wing follow different trajectories to forward flight. The wings do not (as an example) rotate while the biplane stays stationary.

This transition may be easier to conceptualize if it is imagined that the fuselage and wings are locked together (which is not what is shown in this figure). If the fuselage and wings were locked together and the rotors of the biplane were selectively rotated at the same speeds used to achieve the transition shown here, the biplane would end up with the rotors rotating in the vertical plane (as rotors do in diagram 203) but with the fuselage facing downward. However, since the wings and fuselage can rotate with respect to each other because of the bearing, as the wings "fly around" the fuselage as is shown in diagrams 200-203, the fuselage passively maintains its level orientation relative to the ground.

It is noted that the figure is not necessarily to scale and the aircraft may takeoff substantially vertically before transitioning from a hovering configuration to a forward flight configuration.

FIGS. 1A-1C show only two examples of a float-wing. The following figures show some other float-wing examples.

Figure 3A:
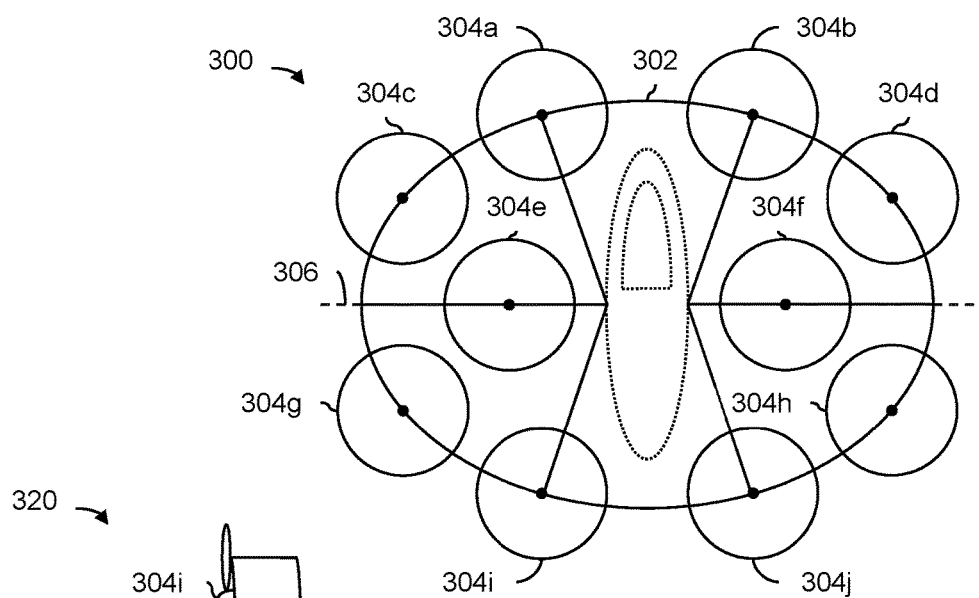
FIG. 3A is a diagram illustrating an embodiment of an overwater aircraft with an annular float-wing.

FIG. 3A is a diagram illustrating an embodiment of an overwater aircraft with an annular float-wing. Diagram 300 shows a top view of the aircraft when the annular wing is in a hovering configuration (e.g., with the rotors rotating in the horizontal plane). This view shows that the annular wing (302) includes rotors which are mounted to the crossbars and are completely inside a cylindrical volume created by the annular wing (e.g., rotors 304e and 304f) and rotors which are attached to the (leading) edge of the annular wing (e.g., rotors 304a-304d and 304g-304j). As described above, the rotors are attached in a fixed manner to the annular wing such that the angle and/or position of the rotors cannot change relative to the wing.

Figure 3B:
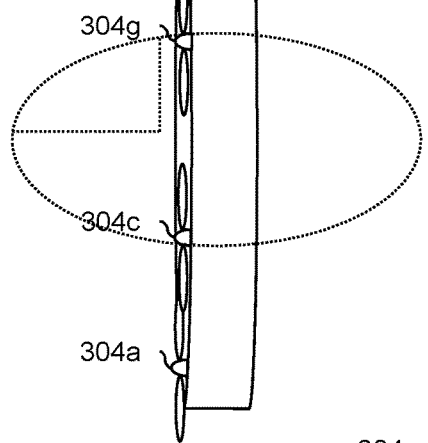
FIG. 3B is a diagram illustrating an embodiment of an overwater aircraft with an annular float-wing.

FIG. 3B is a diagram illustrating an embodiment of an overwater aircraft with an annular float-wing. Diagram 320 shows a side view of the aircraft when the annular wing is in a forward flight configuration (e.g., with the rotors rotating in the vertical plane). To preserve the readability of this diagram, not all rotors are shown in this view. To rotate the annular wing from the forward flight position shown in diagram 320 to the hovering position shown in diagram 300, the rotors are selectively rotated at different speeds in order to create a differential. For example, if the rotors are assigned to one of the three groups, the following relative rotational speeds may be used. Naturally, the rotors may be grouped in some other manner in order to rotate the annular wing.

TABLE 1

Example relative rotors speeds to transition from forward flight mode to hovering mode for FIG. 3.

| Rotates the Slowest | Median Speed | Rotates the Fastest |
| --- | --- | --- |
| Rotors 304a-304d | Rotors 304e and 304f | Rotors 304g-304j |

Rotating the rotors at different speeds per Table 1 (or some other combination of relative speeds) causes the annular wing to change from the hovering configuration shown in diagram 300 to the forward flight configuration shown in diagram 320.

Although not shown in diagram 320, the crossbars (e.g., running from the inside of the annular wing to the bearing and/or side of the fuselage) extend from the leading edge of the annular wing (e.g., where the rotors are attached) to the trailing edge of the annular wing (e.g., which are submerged when the aircraft is floating). This permits the crossbars of the annular wing (e.g., in addition to the ring-shaped part of the annular wing) to provide lift during forward flight.

Figure 3C:
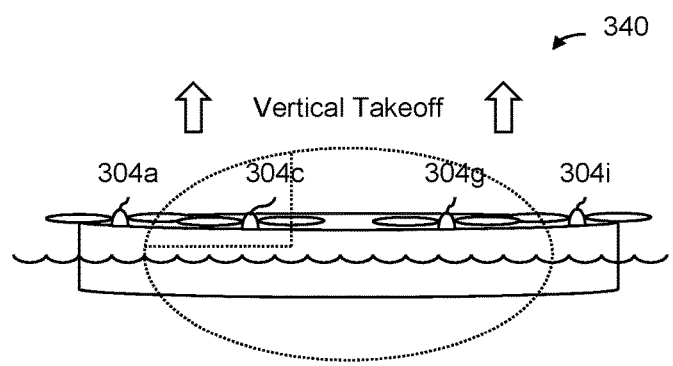
FIG. 3C is a diagram illustrating an embodiment of an overwater aircraft with an annular float-wing.

FIG. 3C is a diagram illustrating an embodiment of an overwater aircraft with an annular float-wing. Diagram 340 shows a side view of the aircraft when the annular wing is in a hovering configuration and the aircraft is floating. To transition from the forward flight configuration to the hovering configuration, the opposite of Table 1 may be used. As described above, although diagram 340 does not show it, the crossbars of the annular wing extend from to the trailing edge. This permits the crossbars and ring-shaped part of the annular wing (e.g., specifically, the trailing half) to displace water and provide buoyancy when the wing is in the position shown and the aircraft is floating.

The arrangement and number of rotors shown here is merely exemplary and is not intended to be limiting. For example, in one alternate configuration, the rotors are mounted only to the crossbars of the annular wing with the leading edge of the crossbars slightly recessed compared to the leading edge of the ring-shaped part of the annular wing. This difference permits the rotors (when mounted to the leading edge of the crossbars) to be within a conceptual cylindrical volume created by the ring-shaped part of the annular wing. One benefit to this design is that all of the rotors are shielded by the annular wing, making it less likely that the rotors will hit anyone or anything. Another benefit is that with the rotors shielded by the annular wing, the walls of the annular wing act to at least partially block or reflect the noise created by the rotors. If the rotors were instead visible over the annular wing then the noise created by the rotors would not be blocked by the annular wing.

Using volume as a metric, the volume of the exemplary annular float-wing shown (e.g., including crossbars) is greater than the volume of the exemplary biplane float-wing (e.g., including crossbars) shown in FIGS. 1A-1C for comparable aircraft. This larger volume permits the exemplary annular float-wing to displace more water, which permits the annular float-wing to have better buoyancy than the exemplary biplane float-wing. For this reason, an annular float-wing may be more attractive than some other float-wing shapes.

Figure 4A:
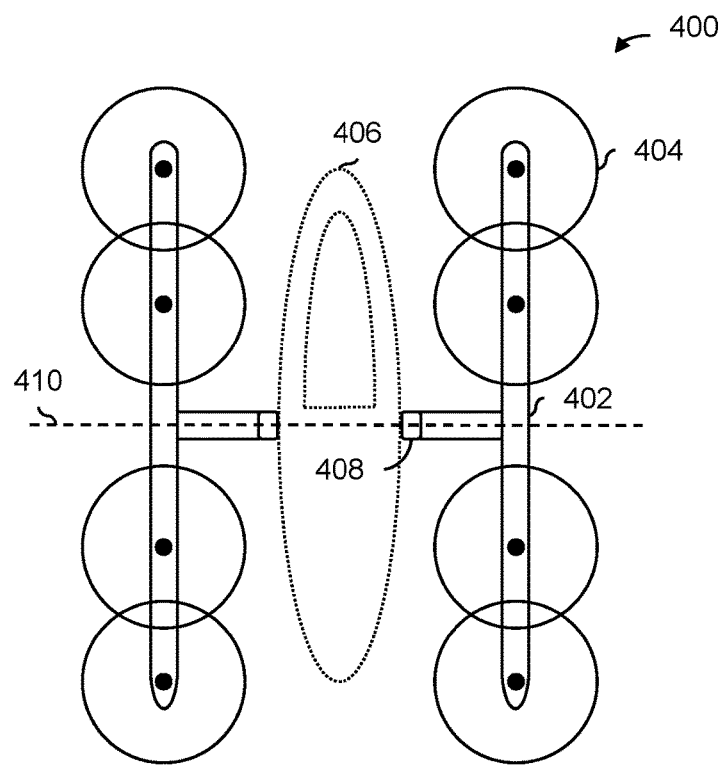
FIG. 4A is a diagram illustrating an embodiment of an H-shaped float-wing.

FIG. 4A is a diagram illustrating an embodiment of an H-shaped float-wing.

Diagram 400 shows a top view of the exemplary float-wing when the wing is in a hovering position. As shown from that view, the H-wing (402) has eight rotors (404) attached to it, four on each side. The fuselage (406) and H-wing (402) are attached via a bearing (408) which permits the fuselage and H-wing to rotate with respect to each other about the axis of rotation (410).

As described above, the rotors are rotated at different speeds in order to transition from a hovering configuration to a forward flight configuration (or vice versa). For example, to go from a hovering configuration to a forward flight configuration (not shown in this figure), the four rotors closest to the nose may be rotated the slowest, the two center rotors may be rotated at a faster speed, and the four rotors closest to the tail may be rotated at an even faster speed. This would create a lift differential which would cause the H-wing to rotate into the forward flight configuration (e.g., by causing the H-wing to fly into the forward flight position or configuration). The bearing (408) permits the fuselage to passively rotate so that the fuselage remains level with the pilot in an upright position.

Figure 4B:
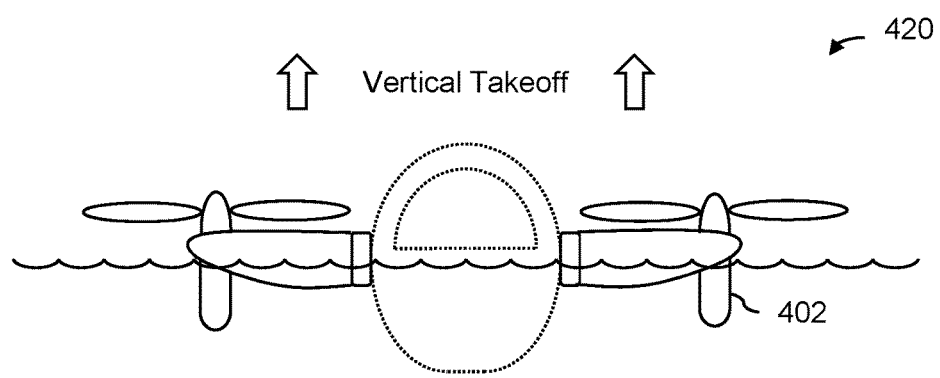
FIG. 4B is a diagram illustrating an embodiment of an H-shaped float-wing.

FIG. 4B is a diagram illustrating an embodiment of an H-shaped float-wing. Diagram 420 shows a front view of the aircraft, where the H-wing (402) is still in a hovering position. As shown in this figure, the H-wing is at least partially submerged when the aircraft is floating. As described above, the H-wing is lightweight and provides buoyancy when the aircraft is floating.

It is noted that the drawing is not to scale and in various embodiments a variety of different dimensions (e.g., span, length, etc.) may be used. For example, as shown in diagram 400, the length of the fuselage is shorter than the length of the H-wing. In some other embodiments, the fuselage is longer than the H-wing (or some other type of wing). Similarly, the number and placement of rotors on the H-wing is merely exemplary and is not intended to be limiting.

Figure 5A:
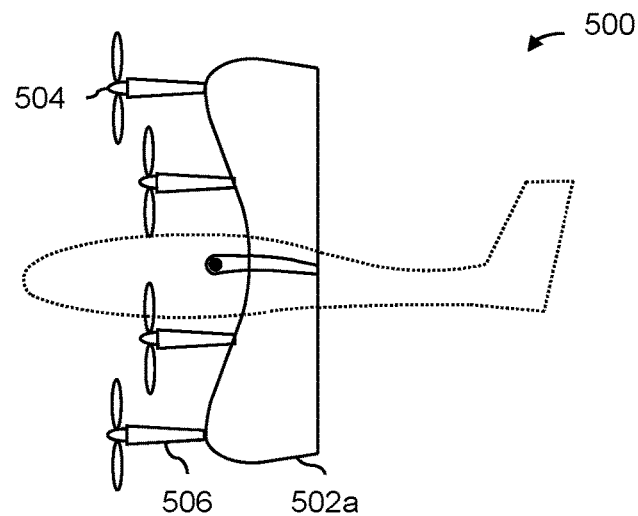
FIG. 5A is a diagram illustrating an embodiment of an H-shaped float-wing with rotors attached to the wings using dowels.

FIG. 5A is a diagram illustrating an embodiment of an H-shaped float-wing with rotors attached to the wings using dowels. Diagram 500 shows a side view where the H-wing (502a) is in a forward flight position. In this example, the rotors (504) are attached to the wing via a post or dowel (506) which elevates the rotor above the wing.

Figure 5B:
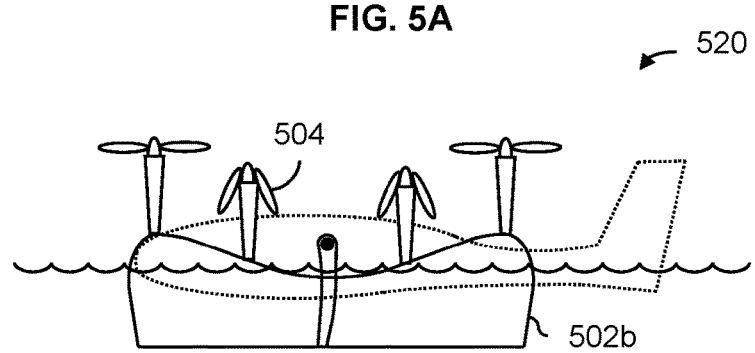
FIG. 5B is a diagram illustrating an embodiment of an H-shaped float-wing with rotors attached to the wings using dowels.

FIG. 5B is a diagram illustrating an embodiment of an H-shaped float-wing with rotors attached to the wings using dowels. Diagram 520 shows a side view where the H-shaped float-wing (502b) is in a hovering position and the aircraft is floating. As shown here, the blades of at least some of the rotors are foldable (504), for example, to make it easier for the pilot to get in and out of the aircraft when the aircraft has landed.

This view also shows the curved shaped of the H-shaped float-wing (502b) where the center of the wing is lower and the tips or ends of the wing are higher when the wing is in a hovering position. This curved shape makes it easier for the pilot to enter/exit the aircraft (note, for example, that the lowest part of the wing is where the pilot would enter/exit a cockpit).

Another benefit to the props is that when the blades are folded down, the additional elevation or separation offered by the prop (506) prevents the blades from hitting the wings. The wings and/or blades of the rotor may be susceptible to breaking or chipping and it may be desirable to have them not come into contact when the rotor starts up (spins down) and/or the blades are folded. The height of the props also prevents the rotors from touching the water, especially when the blades are folded. The rotors may not be completely waterproof and it may be desirable to keep the rotors away from the water when the aircraft is floating.

Figure 5C:
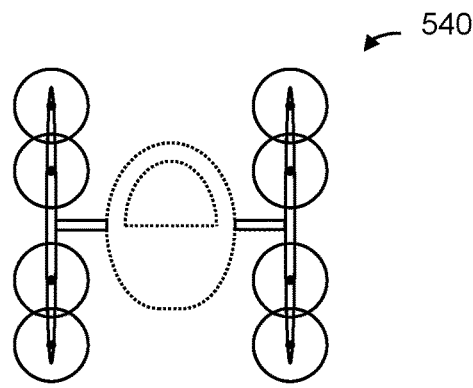
FIG. 5C is a diagram illustrating an embodiment of an H-shaped float-wing with rotors attached to the wings using dowels.

FIG. 5C is a diagram illustrating an embodiment of an H-shaped float-wing with rotors attached to the wings using dowels. Diagram 540 shows a front view of the exemplary aircraft when the wings are in a forward flight configuration. As before, the number and position of the rotors on the H-wing are merely exemplary and are not intended to be limiting.

The following figure illustrates an example of how a float-wing is constructed to have a desired aerodynamic shape and be air-filled to provide buoyancy. Naturally, a variety of manufacturing techniques may be used and this is merely one example.

Figure 6A:
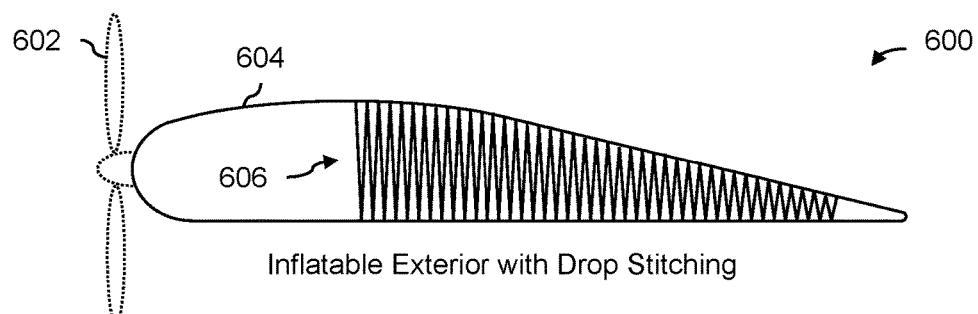
FIG. 6A is a diagram illustrating an embodiment of a float-wing constructed using a drop stitch inflatable exterior and composite inserts.

FIG. 6A is a diagram illustrating an embodiment of a float-wing constructed using a drop stitch inflatable exterior. In the example shown, diagrams 600, 610, and 620 show cross sectional views of the components which are used to construct the float-wing. For context and clarity, each of the cross sections includes a rotor (602) to show which edge of the float-wing is the leading edge and which edge is the trailing edge. The cross section shown is merely exemplary and is not intended to be limiting. A variety of float-wing shapes may be manufactured using this process.

Diagram 600 shows the inflatable exterior (604) and the drop stitching (606). The stitching (which goes back and forth between the top and bottom layers of the inflatable exterior) permits a specific shape to be maintained even if the float-wing is inflated with a relatively high PSI. Although not shown here, in some embodiments a float-wing is constructed using drop stitching without any inserts.

Figure 6B:
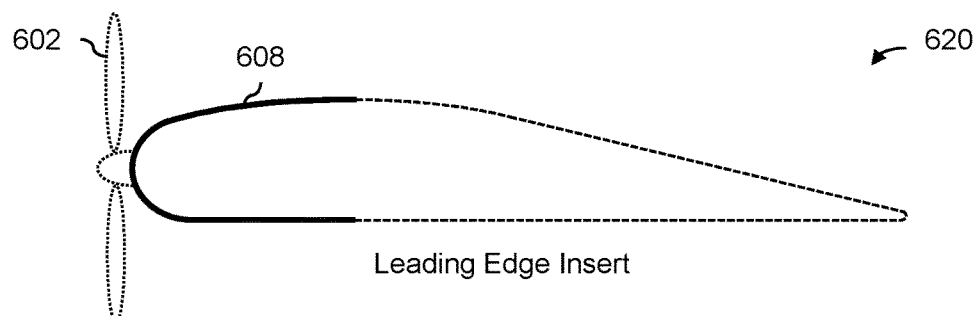
FIG. 6B is a diagram illustrating an embodiment of a composite insert of a float-wing constructed using a drop stitch inflatable exterior.
Figure 6C:
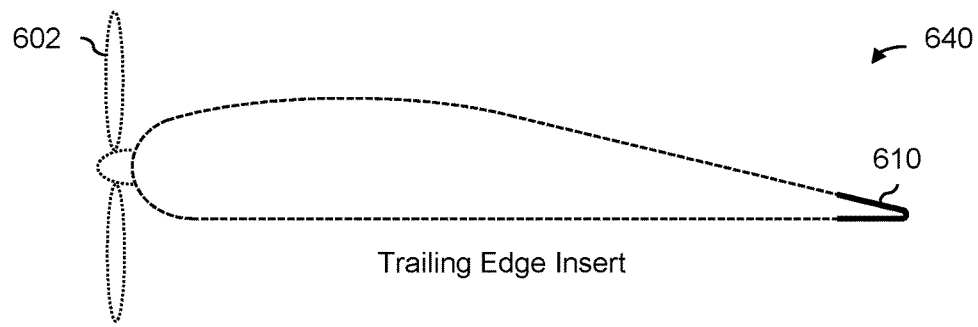
FIG. 6C is a diagram illustrating an embodiment of a composite insert of a float-wing constructed using a drop stitch inflatable exterior.

FIG. 6B is a diagram illustrating an embodiment of a composite insert of a float-wing constructed using a drop stitch inflatable exterior. Diagram 620 shows the leading edge insert (608). FIG. 6C is a diagram illustrating an embodiment of a composite insert of a float-wing constructed using a drop stitch inflatable exterior. Diagram 640 shows the trailing edge insert (610). For context, the inflatable exterior is shown with a dashed line in diagrams 620 and 640 to show how the inserts fit with respect to the exterior. The inserts in this example are made up of a composite material, which is desirable because it is both lightweight and strong. The inserts are attached to the interior of the inflatable exterior, for example using an adhesive such as glue.

The rigidity of the inserts prevents the drop stitch machinery from sewing the drop stitching where the inserts are attached to the inflatable exterior. For this reason, the stitching is in the middle of the cross section where the leading edge insert and the trailing edge insert do not block the needles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
a float-wing having a leading edge and a trailing edge, the float-wing further having an airfoil shape to produce aerodynamic lift when the float-wing flows through air at a lift-producing angle of attack in a forward flight mode of operation; and
the float-wing further includes a submersible portion of the float-wing that includes at least the trailing edge and which is constructed of materials and in a shape selected to produce a buoyancy force sufficient to prevent at least a non-submersible portion of the aircraft from being submersed under conditions in which the aircraft is in a waterborne non-flight position in which at least the trailing edge of the float-wing is submersed but at least the non-submersible portion of the aircraft is not submersed;
wherein the float-wing is a rotatable wing configured to rotate about a fuselage of the aircraft to transition between the forward flight mode of operation and a hovering mode of operation.

2. The aircraft recited in claim 1, wherein the float-wing is one or more of the following: a bi-plane wing, an annular wing, or an H-shaped wing.

3. The aircraft recited in claim 1, further comprising a fixed tail wing.

4. The aircraft recited in claim 1, wherein:
in the hovering mode of operation, one or more rotors connected to the rotatable wing are positioned to rotate in a horizontal plane;
in the forward flight mode of operation, the rotors connected to the rotatable wing are positioned to rotate in a vertical plane; and
the float-wing transitions between the hovering mode of operation and the forward flight mode of operation by rotating about a bearing coupling the float-wing to the fuselage.

5. The aircraft recited in claim 1, wherein:
in the hovering mode of operation, one or more rotors connected to the rotatable wing are positioned to rotate in a horizontal plane;
in the forward flight mode of operation, the rotors connected to the rotatable wing are positioned to rotate in a vertical plane; and
at least some of the rotors are connected to the leading edge of the rotatable wing.

6. The aircraft recited in claim 1, wherein:
the float-wing is a rotatable bi-plane wing;
in the hovering mode of operation, one or more rotors connected to the rotatable bi-plane wing are positioned to rotate in a horizontal plane;
in the forward flight mode of operation, the rotors connected to the rotatable bi-plane wing are positioned to rotate in a vertical plane; and
at least some of the rotors are connected to the leading edge of the rotatable bi-plane wing.

7. The aircraft recited in claim 1, wherein:
the float-wing is a rotatable annular wing;
in the hovering mode of operation, one or more rotors connected to the rotatable annular wing are positioned to rotate in a horizontal plane;
in the forward flight mode of operation, the rotors connected to the rotatable annular wing are positioned to rotate in a vertical plane; and
at least some of the rotors are connected to the leading edge of the rotatable annular wing.

8. The aircraft recited in claim 1, wherein:
the float-wing is a rotatable annular wing having a crossbar;
in the hovering mode of operation, one or more rotors connected to the rotatable annular wing are positioned to rotate in a horizontal plane;
in the forward flight mode of operation, the rotors connected to the rotatable annular wing are positioned to rotate in a vertical plane; and
at least some of the rotors are connected to a leading edge of the crossbar.

9. The aircraft recited in claim 1, wherein:
the float-wing is a rotatable annular wing having a crossbar and a ring-shaped part;
in the hovering mode of operation, one or more rotors connected to the rotatable annular wing are positioned to rotate in a horizontal plane;
in the forward flight mode of operation, the rotors connected to the rotatable annular wing are positioned to rotate in a vertical plane;
at least some of the rotors are connected to the leading edge of the crossbar; and
at least some of the rotors are connected to the leading edge of the ring-shaped part.

10. The aircraft recited in claim 1, wherein:
the float-wing is a rotatable H-shaped wing;
in the hovering mode of operation, one or more rotors connected to the rotatable H-shaped wing are positioned to rotate in a horizontal plane;
in the forward flight mode of operation, the rotors connected to the rotatable H-shaped wing are positioned to rotate in a vertical plane; and
at least some of the rotors are connected to the leading edge of the rotatable H-shaped wing.

11. The aircraft recited in claim 1, wherein the float-wing includes an inflatable exterior with drop stitching between a first surface and a second surface of the inflatable exterior.

12. The aircraft recited in claim 1, wherein the float-wing includes:
an inflatable exterior with drop stitching between a first surface and a second surface of the inflatable exterior; and
an insert which is inserted into the inflatable exterior.

13. The aircraft recited in claim 1, wherein the float-wing includes:
an inflatable exterior with drop stitching between a first surface and a second surface of the inflatable exterior; and an insert which is inserted into the inflatable exterior, wherein:
  in the hovering mode of operation, one or more rotors connected to the rotatable wing are positioned to rotate in a horizontal plane;
  in the forward flight mode of operation, the rotors connected to the rotatable wing are positioned to rotate in a vertical plane; and
  at least some of the rotors are connected to the leading edge of the rotatable wing.

14. The aircraft recited in claim 1, wherein the float-wing includes:
an inflatable exterior with drop stitching between a first surface and a second surface of the inflatable exterior; and
an insert which is inserted into the inflatable exterior, wherein:
  the float-wing is a rotatable bi-plane wing;
  in the hovering mode of operation, one or more rotors connected to the rotatable bi-plane wing are positioned to rotate in a horizontal plane;
  in the forward flight mode of operation, the rotors connected to the rotatable bi-plane wing are positioned to rotate in a vertical plane; and
  at least some of the rotors are connected to the leading edge of the rotatable bi-plane wing.

15. The aircraft recited in claim 1, wherein the float-wing includes:
an inflatable exterior with drop stitching between a first surface and a second surface of the inflatable exterior; and
an insert which is inserted into the inflatable exterior, wherein:
  the float-wing is a rotatable annular wing;
  in the hovering mode of operation, one or more rotors connected to the rotatable annular wing are positioned to rotate in a horizontal plane;
  in the forward flight mode of operation, the rotors connected to the rotatable annular wing are positioned to rotate in a vertical plane; and
  at least some of the rotors are connected to the leading edge of the rotatable annular wing.

16. The aircraft recited in claim 1, wherein the float-wing includes:
an inflatable exterior with drop stitching between a first surface and a second surface of the inflatable exterior; and
an insert which is inserted into the inflatable exterior, wherein:
  the float-wing is a rotatable annular wing which in turn includes a crossbar;
  in the hovering mode of operation, one or more rotors connected to the rotatable annular wing are positioned to rotate in a horizontal plane;
  in the forward flight mode of operation, the rotors connected to the rotatable annular wing are positioned to rotate in a vertical plane; and
  at least some of the rotors are connected to the leading edge of the crossbar.

17. The aircraft recited in claim 1, wherein the float-wing includes:
an inflatable exterior with drop stitching between a first surface and a second surface of the inflatable exterior; and
an insert which is inserted into the inflatable exterior, wherein:
  the float-wing is a rotatable annular wing which in turn includes a crossbar and a ring-shaped part;
  in the hovering mode of operation, one or more rotors connected to the rotatable annular wing are positioned to rotate in a horizontal plane;
  in the forward flight mode of operation, the rotors connected to the rotatable annular wing are positioned to rotate in a vertical plane;
  at least some of the rotors are connected to the leading edge of the crossbar; and
  at least some of the rotors are connected to the leading edge of the ring-shaped part.

18. The aircraft recited in claim 1, wherein the float-wing includes:
an inflatable exterior with drop stitching between a first surface and a second surface of the inflatable exterior; and
an insert which is inserted into the inflatable exterior, wherein:
  the float-wing is a rotatable H-shaped wing;
  in the hovering mode of operation, one or more rotors connected to the rotatable H-shaped wing are positioned to rotate in a horizontal plane;
  in the forward flight mode of operation, the rotors connected to the rotatable H-shaped wing are positioned to rotate in a vertical plane; and
  at least some of the rotors are connected to the leading edge of the rotatable H-shaped wing.

* * * * *